US010358079B2

(12) United States Patent
Rubia et al.

(10) Patent No.: US 10,358,079 B2
(45) Date of Patent: Jul. 23, 2019

(54) SUPPORT FOR AN ILLUMINATION MEANS FOR A MOTOR VEHICLE

(71) Applicant: VALEO ILUMINACION, Martos (ES)

(72) Inventors: Juan-Antonio Rubia, Martos (ES);
Leandro Rodriguez, Martos (ES);
Ramon Sanchez, Martos (ES);
Juan-Francisco Moreno, Martos (ES);
Damien Cabanne, Martos (ES);
Ricardo Fernandez, Martos (ES); Eric Moisy, Martos (ES)

(73) Assignee: VALEO ILUMINACION, Martos (ES)

( * ) Notice: Subject to any disclaimer, the term of this patent is extended or adjusted under 35 U.S.C. 154(b) by 35 days.

(21) Appl. No.: 15/644,033

(22) Filed: Jul. 7, 2017

(65) Prior Publication Data

US 2018/0009365 A1  Jan. 11, 2018

(30) Foreign Application Priority Data

Jul. 7, 2016 (FR) ..................... 16 56528

(51) Int. Cl.
*B60Q 1/04* (2006.01)
*F21V 17/10* (2006.01)
*F21V 23/06* (2006.01)
*F21S 43/19* (2018.01)
*F21S 43/145* (2018.01)
*F21Y 115/15* (2016.01)

(52) U.S. Cl.
CPC .......... *B60Q 1/0483* (2013.01); *F21S 43/145* (2018.01); *F21S 43/19* (2018.01); *F21V 17/101* (2013.01); *F21V 23/06* (2013.01); *F21Y 2115/15* (2016.08)

(58) Field of Classification Search
None
See application file for complete search history.

(56) References Cited

U.S. PATENT DOCUMENTS

2016/0215963 A1   7/2016  Dubose et al.

FOREIGN PATENT DOCUMENTS

| EP | 2592331 A1 * | 5/2013 | ............ F21S 41/192 |
|----|--------------|--------|---------------------------|
| EP | 2 886 936 A1 | 6/2015 | |
| EP | 3 009 301 A1 | 4/2016 | |
| FR | 2 580 377 | 10/1986 | |
| WO | WO 2015/032949 A1 | 3/2015 | |

OTHER PUBLICATIONS

French Preliminary Search Report dated Mar. 10, 2017 in French Application 16 56528 filed on Jul. 7, 2016 (with English Translation of Categories of Cited Documents).

* cited by examiner

*Primary Examiner* — Elmito Breval
(74) *Attorney, Agent, or Firm* — Oblon, McClelland, Maier & Neustadt, L.L.P.

(57) ABSTRACT

A support for at least one illumination means for a motor vehicle that includes a base for securing to a structural element of the vehicle and at least one support module configured in order to form a housing for receiving said illumination means. At least a part of the support module is produced from a transparent or translucent material.

18 Claims, 2 Drawing Sheets

SUPPORT FOR AN ILLUMINATION MEANS FOR A MOTOR VEHICLE

The field of the present invention is that of motor vehicle lighting and/or signaling devices, and the present invention relates more particularly to illumination devices that employ at least one organic electroluminescent diode.

The illumination devices of a motor vehicle have, first, to meet functional criteria, such as the illumination power and the precise arrangement required for producing a specific, approved beam, or, alternately, a long service life, minimal overall size, and ease of use, and they must, second, meet esthetic conditions imposed by automobile constructors for the visual identification of their vehicle.

The use of illumination sources employing one or more electroluminescent diodes has become commonplace.

The use of organic electroluminescent diodes, which are also designated herein by the acronym OLED (organic light-emitting diode), has recently increased and is conventionally composed of two electrodes (an anode and a cathode) between which are placed at least one emission layer, produced from an electroluminescent material, plus an assembly of electron transport layers, the emission layer and electron transport layers all being produced from organic materials. A voltage has to be applied between the two electrodes in order to excite the transport layers and in the emission layer, and to obtain the electroluminescence of the material constituting said emission layer.

Although the illumination power emitted by an OLED-type source is less than that emitted by a non-organic electroluminescent diode (LED, for light-emitting diode) source, such sources are increasingly used in the automobile field both for actual vehicle lighting or signaling and for esthetic reasons, in particular the visual, luminous signature of the vehicle.

An illumination source of OLED type for a motor vehicle is generally composed of an emissive part arranged opposite a lens of a headlamp and a connection part via which this illumination module is connected to a device for supplying electrical power to the vehicle lighting and/or signaling device and for controlling same. The connection part is mounted in a support, the emissive part of which projects.

The present invention relates to a support for at least one illumination means for a motor vehicle, said support comprising a base for securing to a structural element of the vehicle and at least one support module configured in order to form a housing for receiving said illumination means. According to the invention, at least a part of said support module is produced from a transparent or translucent material.

In particular, this part of the support module may be designed to be visible from the exterior of the vehicle when the support is secured to the structural element.

Thus, not only when the illumination means is switched on but also when it is switched off, the emissive part can give the impression of being suspended from the support, which offers interesting design perspectives. These illumination source arrangements can thus be made even more attractive, in particular by enhancing the impression that the light sources are floating in the associated illumination module.

It is understood that, according to the invention, the illumination means may be a means for lighting up the road, a signaling means of the vehicle, or a means for lighting up the interior of the vehicle.

Provision may be made for the support to comprise the illumination means.

In one particular embodiment, the support module comprises a back wall against which said illumination means can be applied and which is bordered by a holding frame, at least said holding frame being produced from a transparent or translucent material.

According to various features of the invention, taken alone or in combination, it will be possible to provide for:
- the holding frame to comprise at least stops extending the back wall substantially perpendicularly; the holding frame extending the back wall substantially perpendicularly, thereby defining a housing capable of receiving the connection part;
- the holding frame to comprise a set of first lateral walls arranged in parallel on the smaller sides of the back wall and two stops extending an end of the lateral walls substantially perpendicularly by bringing one closer to the other in such a manner as to narrow the passage between the first lateral walls;
- the stops to interact with the shoulder edges of the connection part of the organic electroluminescent diode;
- the back wall to be extended by a holding tab extending in the plane of the back wall beyond the stops;
- the back wall to have a stud configured as a means of indexing said illumination means; the stud to project from the back wall of the support means;
- the stud to be produced from a transparent or translucent material and, advantageously, the same material as that used to produce the holding frame projecting from the back wall of the support module;
- the back wall of the support module to comprise conductor terminals configured in order to be connected to a metallic part of the illumination means;
- the back wall to comprise an adhesive layer configured in order to hold the illumination means in position;
- the adhesive layer to incorporate metallic means forming said conductor terminals;
- the back wall to be able to comprise, alternately, or in addition to that which has just been presented above, at least one elastically deformable means arranged in order to hold the illumination means in position; by way of non-limiting example, provision may be made for the back wall to be equipped with an elastic tab, or with a spring; this elastic means may be produced from an electrically conducting material so that it is possible for it to be connected to a metallic part of the illumination means; in a variant, provision may be made for screws and a counterpart applying the illumination means onto the back wall;
- the transparent or translucent material to be polycarbonate or poly(methyl methacrylate);
- the support module to extend the base for securing to the structural element substantially perpendicularly.

According to another series of features of the invention, taken alone or in combination, it will be possible to provide for:
- the support to be configured such that, when the organic electroluminescent diodes are in place in their respective support module, the base is concealed by the body of the diodes;
- the emissive part of the organic electroluminescent diode to be able to comprise one or more distinct lighting surfaces.

The invention also relates to an illumination device for a motor vehicle, comprising at least one support module of an illumination means as presented above. The illumination means comprises an emissive part and a connection part, and the device is arranged such that the connection part is secured in a housing of the support module while the emissive part projects from the support module. In this context, the transparent or translucent part of the support module surrounds the connection part of the lighting and/or signaling means.

Advantageously, the illumination means is an organic electroluminescent diode. This diode may, in particular, be a flexible diode.

The illumination means may comprise a bore configured in order to be held around a stud projecting from the back wall of the support module, the stud being produced from transparent or translucent material.

Other features and advantages of the present invention will become more clearly apparent in light of the description and the drawings, among which:

It should first of all be noted that while the figures set out the invention in detail for its implementation, it is, of course, possible for said figures to be used in order better to define the invention if necessary.

Figure 1:
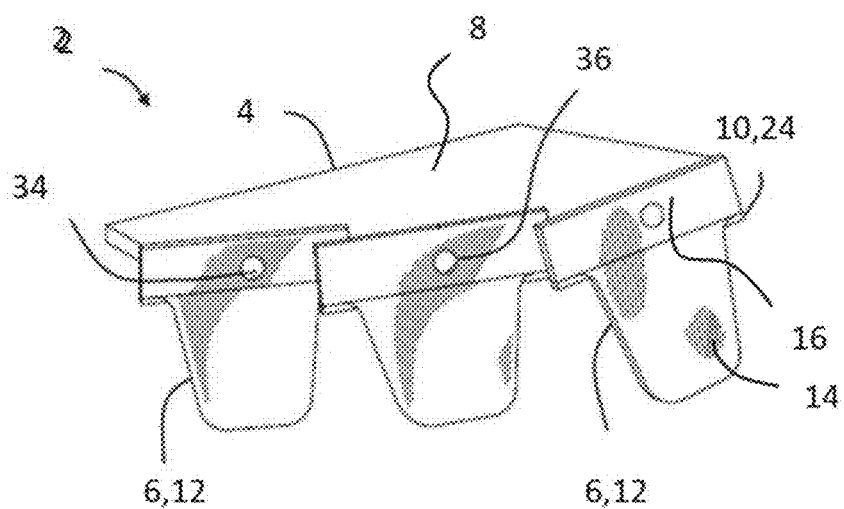
FIG. 1 is a perspective view of a support according to a first embodiment of the invention, configured in order to receive a plurality of organic electroluminescent diodes (OLEDs)

In FIG. 1, a lighting and/or signaling device 2 comprises a support 4 common to a plurality (in this case, three) of lighting and/or signaling means 6.

This lighting and/or signaling device may be applied in a front headlamp or rear light of the vehicle. It will be understood that other applications may be provided for, in particular for interior lighting and/or signaling devices. Furthermore, the lighting means are, in this case, arranged in such a way as to extend substantially vertically: and in a horizontal series, but it will be understood that other orientations could be envisaged without departing from the context of the invention.

The common support 4 composes a base 8, having the form of a plate, and a plurality of support modules 10, configured in order to receive, respectively, an organic electroluminescent diode 12, and extending the base substantially perpendicularly, it being understood that an angle of inclination between the base and the support modules could be defined.

According to different variants, the base 8 and the support modules 10 may be produced independently and secured together later, or, alternately, be formed as a single unit, in a monobloc component, it being noted that "monobloc" is intended to mean that the plate and the support element cannot be separated without one and/or the other being damaged.

Figure 4:
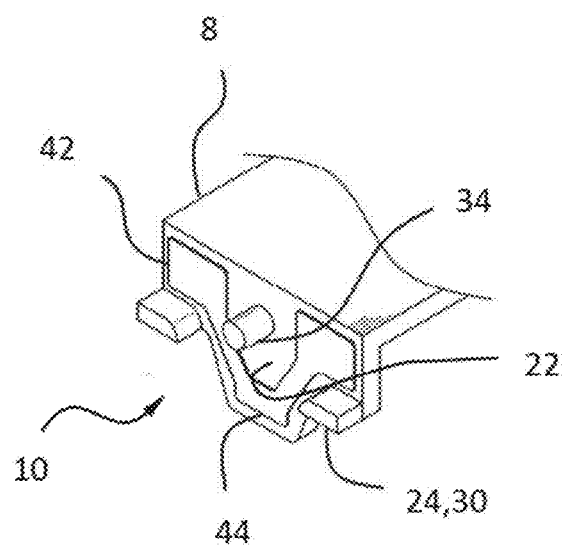
FIG. 4 is a perspective view of a variant embodiment of the support according to the invention.

It will be understood that each support module could be independent of the other support modules, and a description will be given below of a single support module with reference to FIGS. 2 to 4.

The base 8 is configured in order to be secured to the structure of the motor vehicle and, optionally, in order to carry means for controlling the lighting and/or signaling means. When the organic electroluminescent diodes 12 are in place in their respective support module 10, it is noteworthy that the base 8 is concealed by the body of the diodes 12.

The organic electroluminescent diode 12, or OLED, comprises an emissive part 14, and a connection part 16 designed to allow the electrical connection of the emissive part to a device for supplying electrical power and/or controlling the signaling and/or lighting assembly of the vehicle, which is not shown here. The emissive part 14 is conventionally composed of a set of polymer layers sandwiched between an anode and a cathode, and it may have, account being taken of the nature of the materials of which it is composed, a degree of mechanical flexibility. According to different embodiments, the emissive part 14 of the OLED may comprise one or more distinct lighting surfaces. The connection part 16 is produced from an insulating material that is mechanically more rigid and, for example, and in a non-limiting manner, a glass or a polymer resin. According to the embodiment illustrated most particularly in the figures, it may be in the form of a substantially parallelepipedal plate, from one of the major sides of which the emissive part 14 of the OLED extends. In more detail, with reference to FIG. 2, in particular, the emissive part 14 of the OLED extends the connection part 16, substantially in the same plane, from a first major side 18 of the plate forming said connection part, substantially at the centre of this first major side, such that shoulder edges 20 are arranged on either side of the emissive part.

Figure 2:
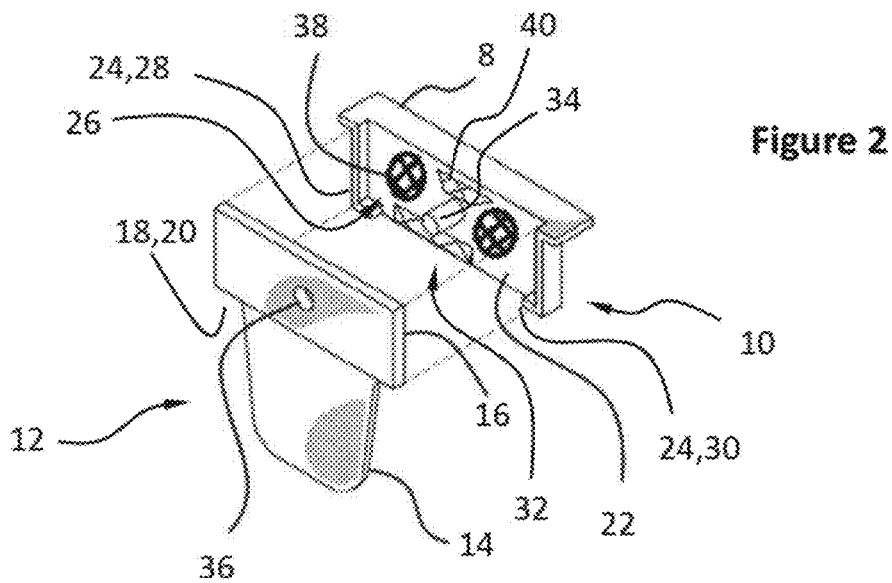
FIG. 2 is a perspective view of a detail of the support of FIG. 1, in an expanded representation of the diode and of the support.
Figure 3:
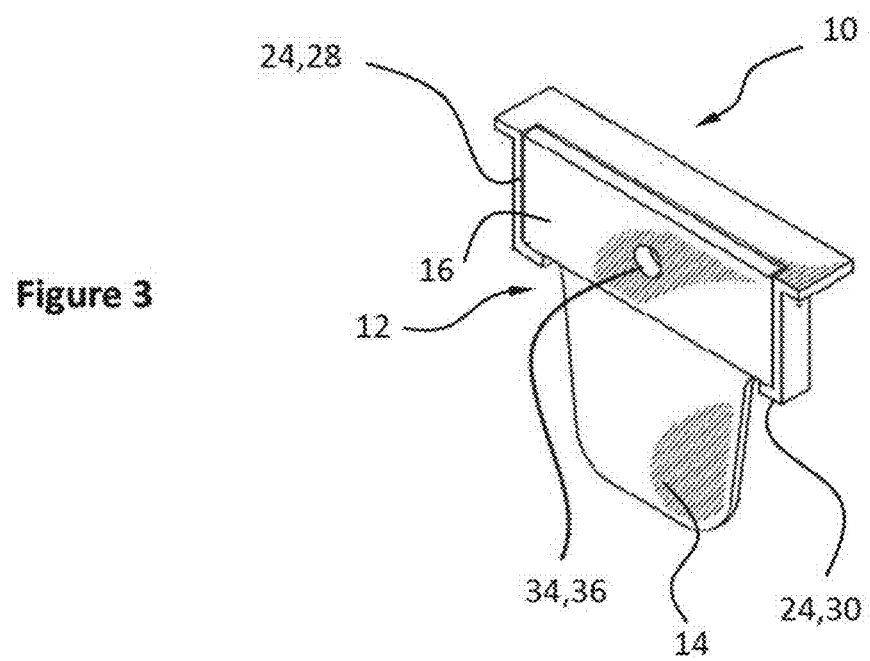
FIG. 3 is a view similar to that of FIG. 2, in which the diode and the support are fitted.

The support module 10, visible in FIGS. 2 and 3 in a first embodiment, comprises a back wall 22 in the form, according to the embodiment illustrated by the figures, of a substantially rectangular plate of which the dimensions are substantially identical to those of the connection part 16 of the OLED.

The support module 10 further comprises a holding frame 24 bordering the back wall 22 at least partially. This holding frame 24 extends the back wall 22 substantially perpendicularly, thus defining a housing 26 capable of receiving the connection part 16. It will be understood that the holding frame 24 makes it possible to hold the plate forming the connection part 16 of the OLED inside the housing 26 in order to prevent, in particular, the OLED falling under the effect of gravity.

According to the embodiment most particularly illustrated in FIGS. 2 and 3, this holding frame consists of a set of first lateral walls 28 arranged in parallel on the smaller sides of the back wall 22 and two stops 30 extending an end of the lateral walls substantially perpendicularly by bringing one closer to the other in such a manner as to narrow the passage between the first lateral walls.

More precisely, the holding means are defined and arranged such that, when the connection part 16 of the OLED is received against the back wall 22 in the housing 26, the stops 30 form a stop against the thickness of the major side of the plate forming said connection part 16, while the first lateral walls 28 form a stop against the thickness of the small side of the plate forming said connection part 16.

The assembly of lateral walls and stops thus defines a kind of holding frame in which the connection part 16 of the OLED 12 is received and held, it being understood that, in this case, no wall is needed opposite the stops 30 owing to the vertical arrangement of the organic electroluminescent diodes 12.

An opening 32 is defined between the two stops 30 to allow a passage for the OLED. Thus, in the assembled position, which is visible in particular in FIG. 3, the connection part 16 can be housed in the housing of the support module while the emissive part 14 can extend outside the support module in order to play a part in the lighting and/or signaling function. The stops 30 interact with the shoulder edges 20 of the connection part 16 of the OLED.

The support module 10 may also comprise elements that make it possible to facilitate the engagement and positioning of the connection plate 16 of the OLED within the housing, and, for example, as may be seen in FIG. 2, a stud 34 projecting from the back wall 22 in order to be able to interact with a complementary form, in this case a bore 36, defined in the thickness of the plate forming the connection part 6.

When the connection part 16 of the OLED is in place in the support module 10, it is appropriate for an electrical contact to be made between these two elements. This is achieved, in particular, by the presence of conductor terminals 38 attached to the back wall 22 forming part of the housing 26 of the connection part 16. The schematic example illustrated in FIG. 2 shows two first conductor terminals 38 in the form of substantially circular components, and second electrical terminals of equivalent form are arranged on the connection part in such a manner that, when the OLED is mounted on the support module, these various electrical connectors are arranged one against another.

It will be understood that these first conductor terminals 38 are connected by electrical tracks, which are not shown here, to a connector capable of interacting with a complementary connector of the electrical device of the vehicle in order to achieve the electrical connection of the latter to a device for supplying electrical power and/or controlling the lighting and/or signaling assembly of the vehicle.

In order to ensure the electrical contact between the first 38 and second conductor terminals, it is appropriate to apply the diode and its connection part 16 against the back wall of the support module, and it is necessary to maintain this position. The holding means described previously make it possible to prevent movement of the diode in directions perpendicular to the direction in which the connection part is applied against the back wall, and provision is made for a complementary securing means to prevent movement of the diode in a direction which is the opposite of the direction in which the connection part is applied against the back wall.

These complementary securing means may, advantageously, take the form of a zone of adhesive bonding arranged between the back wall and the opposite face of the connection part of the diode. It is possible to make provision for a distinct zone 40 of adhesive bonding for the first conductor terminals 38, as illustrated in FIG. 2.

In a variant that is not shown, these complementary securing means may consist of a protective cap covering the housing when the connection part of the OLED is housed therein. In this case, the conductor terminals could be produced on an interior face of the cap, instead of being provided on the back wall of the support module.

According to the invention, it is noteworthy that at least a part of the support module 10 is produced from a transparent or translucent material, and that this transparent or translucent part is chosen from the elements not covered by the OLED when the latter is supported by the support module.

In particular, in the embodiment illustrated in FIG. 1, the first lateral walls 28 and the stops 30 extending them, which form the holding frame of the diode in the support module, are each produced from a transparent or translucent material such that this holding frame is not visible, either when the diode is switched on or when it is switched off, in order that the outside observer has the visual impression that the diode is floating without being held by a support means.

It will be understood that the support module 10 may be entirely formed from a transparent or translucent material or, alternately, in an embodiment that is advantageous in terms of the cost of materials, that it is formed from two different materials. In such a case, on the one hand, a standard opaque material may be used for all parts of the support module concealed by the diode when the latter is housed in the support module and, in particular, the back wall of the housing or the base of the support module, and, on the other hand, the transparent or translucent material for the perceivable parts and, in particular, the walls and stops forming the holding frame and the stud used for indexing the connection part of the diode. It is also possible to select two materials having a different degree of transparency on either side of the support module, with a first, translucent material and a second, transparent material.

The transparent or translucent material may, by way of example, consist of polycarbonate (PC) or poly(methyl methacrylate) (PMMA), it being understood that this choice is neither exhaustive nor limiting, when the chosen material has a simultaneously transparent or translucent character and sufficient rigidity properties for holding and/or indexing the connection part in the support module.

FIG. 3 illustrates the assembled position in which the connection part 16 of the diode is applied against the back wall 22 of the corresponding housing 26. An exterior observer, shown schematically in this figure, is able, when the diode is not switched on, simultaneously to see the assembly of the OLED 12, the holding frame of the support module arranged around the diode, and the indexing stud arranged at the center of the connection part of the diode. The invention offers the advantage of all the elements, other than the OLED, likely to be seen by the external observer being rendered transparent or translucent.

A description will now be given of a second embodiment, with reference to FIG. 4, of a support module capable of receiving an OLED and comprising at least one transparent or translucent part. In this case, again, the holding frame of the diode is produced from a transparent or translucent material.

The support module of this second embodiment differs from that which was described above particularly in that the holding frame projecting from the back wall 22 is limited to the presence of the stops 30. Only these stops are thus to be provided in transparent or translucent material in order to render all the elements arranged around the diode invisible or practically invisible when the diode is applied in the housing of the support module.

No first lateral wall is provided on the smaller sides of the back wall, such that the number of elements to be rendered transparent or translucent is limited, which may allow costs to be limited.

In this context, in order to ensure that the connection part is held in position in the housing, provision is made for an enlarged zone 40 of adhesive bonding, and a conductive adhesive bonding agent is used, that is to say one bearing metallic materials, in order, in one and the same zone, to perform the function of adhesive bonding and the function of conductor terminal.

The adhesive bonding agent could be replaced by any adhesive layer, it being understood that it is advantageous in the context of the present invention for the connection part of the diode to be secured in the housing of the support module without apparent securing means, and for example securing screws, that would detract from the visual effect whereby the diode appears to float without being held by the support module.

Furthermore, the support module in this second embodiment comprises a back wall extended by a holding tab 44, against which the emissive part of the OLED comes to bear when the latter is in place in the support module. The holding tab 44 extends in the plane of the back wall 22, beyond the stops 30 forming the holding frame around the back wall. A wall is thus defined that makes it possible to reduce the overhanging surface of the diode, which allows vibration of the diode when the vehicle is being driven to be limited.

In each of these embodiments, the invention thus achieves its object by proposing an illumination module employing at least one organic electroluminescent diode, its holding in position by a support module making it possible to generate a visual effect whereby this diode floats, without visible mechanical support, because the support module is made totally or partially from transparent or translucent material.

It should, however, be noted that the invention is not restricted to the means and configurations described and illustrated but applies, likewise, to all equivalent means or configurations and to any combination of such means. By way of example, the forms of the plate forming the connection part of the OLED and of the support module described herein are indicative, and the invention likewise covers any other form of connection part and of support, provided the support module has walls forming a stop upon positioning of the diode and provided these positioning stops are produced from a translucent or transparent material.

The invention claimed is:

1. a support for at least one illumination module for a motor vehicle, said support comprising: a base to secure the support to a structural element of the vehicle; and at least one support module that forms a housing to receive said illumination module, wherein at least a part of said support module is produced from a transparent or translucent material; wherein the support module comprises a back wall against which said illumination module is engaged and which is bordered by a holding frame, said holding frame being produced from a transparent or translucent material; wherein the holding frame comprises stops extending from the back wall, and wherein each of the stops is engageable with opposite edges of the illumination module, respectively, such that at least one edge of the illumination module is free from the holding frame.

2. The support according to claim 1, wherein the back wall includes a holding tab that extends in a plane of the back wall and beyond the stops.

3. The support according to claim 1, wherein the support includes a stud that extends perpendicularly from a planar surface of a back wall, and the stud is to index said illumination module to a predetermined position relative to the support.

4. The support according to claim 3, wherein the stud is produced from a transparent or translucent material.

5. The support according to claim 1, wherein a back wall of the support module comprises conductor terminals to connect to a metallic part of the illumination module.

6. The support according to claim 5, wherein the back wall further comprises an adhesive layer to hold the illumination module in position.

7. The support according to claim 6, wherein the adhesive layer incorporates metallic material which forms said conductor terminals.

8. The support according to claim 1, wherein said transparent or translucent material is polycarbonate (PC) or poly (methyl methacrylate) (PMMA).

9. The support according to claim 1, wherein the support module extends substantially perpendicularly from the base.

10. An illumination device for a motor vehicle, comprising at least one of the support according to claim 1.

11. The illumination device according to claim 10, wherein said illumination module comprises art emissive part and a connection part such that the connection part is secured in the housing of the support while the emissive part extends away from the support module, such that the transparent or translucent part of the support module surrounds the connection part of the illumination module.

12. The illumination device according to claim 10, wherein the illumination module is an organic electroluminescent diode.

13. The illumination device according to claim 10, wherein the illumination module comprises a bore, the support module comprises a stud extending from a back wall of the support module, the bore is to receive said stud, and said stud is produced from transparent or translucent material.

14. The support according to claim 1, wherein the back wall includes a stud to index said illumination module into engagement with the holding frame by being inserted into a bore in the illumination module.

15. The support according to claim 1, wherein the back wall of the support module comprises conductor terminals to connect to a metallic part of the illumination module.

16. The support according to claim 1, wherein said transparent or translucent material is polycarbonate (PC) or poly (methyl methacrylate) (PMMA).

17. The support according to claim 1, wherein the support module extends substantially perpendicularly from the base.

18. An illumination device for a motor vehicle, comprising at least one of the support according to claim 1.

* * * * *